May 29, 1928.
O. W. JOHNSON
ATTACHMENT FOR TRACTORS
Original Filed March 16, 1922
1,671,370
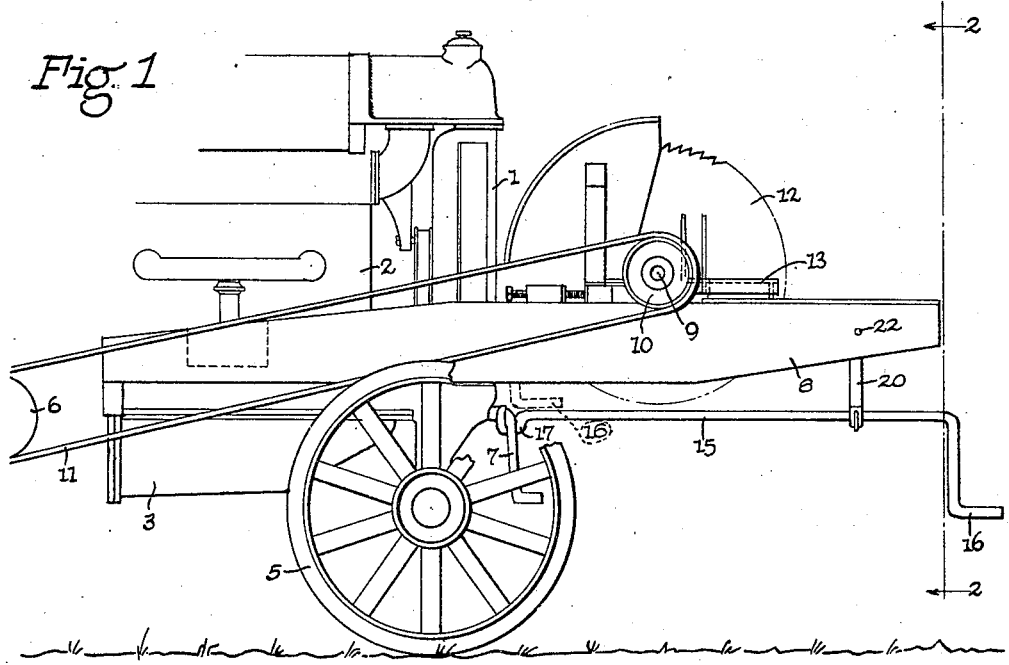
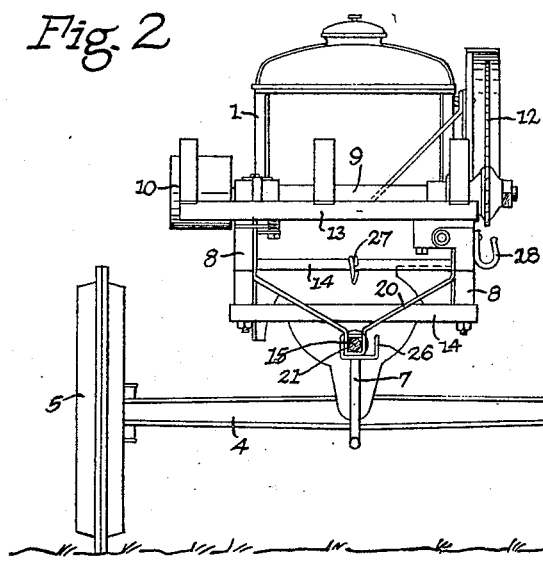
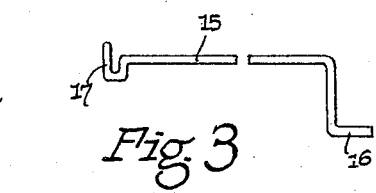
Oliver W. Johnson
Inventor
by Smith & Freeman
Attorneys Patented May 29, 1928.

1,671,370

UNITED STATES PATENT OFFICE.

OLIVER W. JOHNSON, OF GENEVA, OHIO.

ATTACHMENT FOR TRACTORS.

Original application filed March 16, 1922, Serial No. 544,222. Divided and this application filed August 6, 1924. Serial No. 730,547.

This invention relates to an attachment for self-propelled tractors and has for its object the provision of simple, inexpensive, and reliable means whereby the tractor engine can be cranked while the attachment is in place, yet without impeding the ready removal of the attachment and the subsequent cranking of the engine in the usual way. This application is a division of my former application filed March 16, 1922, Serial No. 544,222.

One convenient and practical structure embodying my inventive idea is illustrated in the drawings accompanying and forming a part of this application wherein Fig. 1 is a side elevation of the forward end of a tractor having my improvements applied thereto; Fig. 2 is a front elevation of the same; Figs. 3 and 4 are detail views of one form of the auxiliary crank; and Fig. 5 is an enlarged detail view of the crank supporting bracket.

The tractor which I have chosen for purposes of illustration is of the general type having a radiator 1 at the forward end, an engine 2 in the rear thereof having a crank case 3, a transverse front axle 4 carrying the road wheels 5—5, and a work pulley 6 at one side operated by the engine independently of the propulsion wheels, the latter not being shown. The engine is started by means of a longitudinal crank 7 projecting from beneath the radiator 1 in the well known manner. With this tractor I have shown an attachment for sawing firewood, builder's lumber, etc., comprising essentially a pair of sills 8—8 secured to opposite sides of the tractor body and projecting forwardly of the radiator at a point above the crank 7. Suitably mounted upon these sills is a transverse arbor 9 having thereon a driving pulley 10 which is connected by a belt 11 to the work pulley 6. Carried by this arbor is a circular saw 12 and carried by the sills is a suitable saw table 13 co-operating therewith, though it will be understood that I do not limit myself to a sawing attachment but present the same merely as typical of any type of work performing mechanism since a corn sheller, barley cutter, cement mixer, tool grinder or other work-performing tools could equally be employed.

These sills are connected together by suitable cross pieces 14—14 and together constitute a frame which may take any one of many different forms, all of which are similar in respect of the fact that they impede access to the starting crank 7. I therefore provide a supplemental starting crank consisting of a long shank or stem 15 having a handle 16 at its forward end and provided at its rear end with provisions for detachably engaging the crank 7 in operating relation. In the present embodiment this provision comprises an offset or spirally formed open hook 17 so arranged that if the supplemental crank be supported longitudinally of the attachment and then merely turned in the usual manner of starting an engine, the spirally formed hook will engage the shank and handle member of the crank 7 as clearly shown in Fig. 1 and will impart the necessary rotation thereto. When in use the shank of the supplemental crank aligns with the shank of the crank 7 and the hook 17 should be just large enough to engage the crank 7 as described and maintain its axial alignment.

For supporting the forward end of said crank I provide a suitable hanger 20 depending from the forward end of the frame and in the form here shown comprising a central U-shaped portion 21 adapted to receive in rotatable fashion the shank 15 and terminating in outwardly spreading arms suspended to the frame at the point 22. For holding the shank 15 in this U-shaped bearing I have provided a keeper pin 23 reciprocable through suitable apertures in the upper side of the U, the outer end of this pin being then bent downwardly as shown at 24, then passing horizontally beneath the recess as shown at 25 and terminating in an upstanding stop member 26 adapted to limit the reciprocation of the pin and thus prevent its loss while permitting sufficient movement of the same to enable the insertion and withdrawal of the supplemental crank. When the supplemental crank is not in use I preferably rotate the bracket 20 about its suspending bolts and secure it out of arm's reach by means of a suitable hook 27 secured to one of the cross members of the frame; and the crank can be disposed of in any desired manner preferably by suspending it lengthwise of one of the sills by suitable hooks 28 as shown in Fig. 2, whereupon the handle 16 may conveniently take the position shown in dotted lines in Fig. 1.

It will be understood that many changes in the shape of this crank and in the provisions for its attachment to the original crank may be made within the scope of my invention and I do not limit myself in this regard nor limit myself to any of the details herein shown except as the same are also recited in my several claims.

Having thus described my invention what I claim is:

1. In an attachment for self-propelled tractors of the type having a starting crank at the forward end the combination of a pair of sills, work-performing and work-supporting mechanism carried by said sills, means for rigidly securing said sills to the opposite sides of a self propelled tractor to project forwardly therefrom at a level above its crank, a bearing carried by said sills near the forward ends thereof, a supplemental starting crank having a stem adapted to be rotatably fitted within said bearing and having means at its rear end to engage said first mentioned crank in operating relation, and power transmission means connecting said work-performing devices to a more distant part of the tractor engine.

2. In an attachment for self-propelled tractors of the type having a starting crank at the forward end, the combination of a pair of sills, work-performing and work-supporting mechanism carried by said sills, means for rigidly securing said sills to the opposite side of a self propelled tractor at a level above its crank, a hanger carried by the forward ends of said sills and projecting substantially into line with said first mentioned crank, said hanger being formed with a bearing having an open side, a supplemental starting crank having a stem adapted to be rotatably fitted in said bearing and provided at its rear end with means to engage said first mentioned crank in operating relation, and means for securing said supplemental crank detachably in said bearing.

3. In an attachment for self-propelled tractors of the type having a starting crank at the forward end, in combination, a frame adapted for attachment to the forward end of a self propelled tractor above its starting crank, work-performing mechanism carried by said frame, a supplemental starting crank having its rear end formed to engage said first crank in operating relation, a supplemental bearing carried by the forward end of said frame adapted to receive said supplemental crank, and power transmission means connecting said work-performing devices to a more distant part of the tractor engine.

4. In a device of the character described, the combination with a self-propelled vehicle having a starting crank at its forward end, of a frame rigidly secured to said vehicle and projecting forwardly therefrom above said crank, work-performing mechanism carried by said frame, driving connections between said work-performing mechanism and a part of the tractor engine other than said starting crank, and a supplemental starting member journaled to said frame and formed at its rear end to engage said first starting crank in operating relation.

5. An attachment for self-propelled tractors of the type having a longitudinal starting crank at its forward end and a transverse work pulley at one side, comprising a frame, means for rigidly securing said frame to the front of said tractor above said starting crank, work-performing mechanism carried by said frame and comprising a transverse pulley adapted to be belted to said first pulley, and a supplemental starting crank journaled to said frame and adapted to engage said first starting crank in operating relation.

6. An attachment for self-propelled tractors comprising an independent frame adapted for attachment to the forward end of the tractor above its crank, and a supplemental crank journaled to said frame and having at its rear end a spirally formed hook adapted to engage the first crank in operating relation.

In testimony whereof, I hereunto affix my signature.

OLIVER W. JOHNSON.